(12) United States Patent
Kume

(10) Patent No.: US 6,886,394 B1
(45) Date of Patent: May 3, 2005

(54) ROUGHNESS MEASURING METHOD AND APPARATUS

(75) Inventor: Shigefumi Kume, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 711 days.

(21) Appl. No.: 09/985,135

(22) Filed: Nov. 1, 2001

(30) Foreign Application Priority Data

Nov. 6, 2000 (JP) ........................................ 2000-337880

(51) Int. Cl.[7] ........................ B23Q 17/09; G01N 19/02; G01B 5/28
(52) U.S. Cl. .......................................... 73/105; 73/104
(58) Field of Search ...................... 73/104, 105; 33/551, 33/554, 504; 250/559.2

(56) References Cited

U.S. PATENT DOCUMENTS 5,740,616 A * 4/1998 Seddon et al. ................. 33/554

6,435,014 B1 * 8/2002 Palmquist et al. ............. 73/104

* cited by examiner

Primary Examiner—Hezron Williams
Assistant Examiner—Tamiko Bellamy
(74) Attorney, Agent, or Firm—Oliff & Berridge, PLC

(57) ABSTRACT

In the roughness measuring apparatus, a parameter to be evaluated and its maximum value are set by using a keyboard. If there is an evaluated area with a roughness over the maximum value among the roughness values which have been computed, a roughness is computed by using only measurement data of an evaluated area with a roughness value which is the same or under the maximum value, and a roughness is computed by using only measurement data of an evaluated area with a roughness value over the maximum value.

6 Claims, 5 Drawing Sheets

F I G. 2
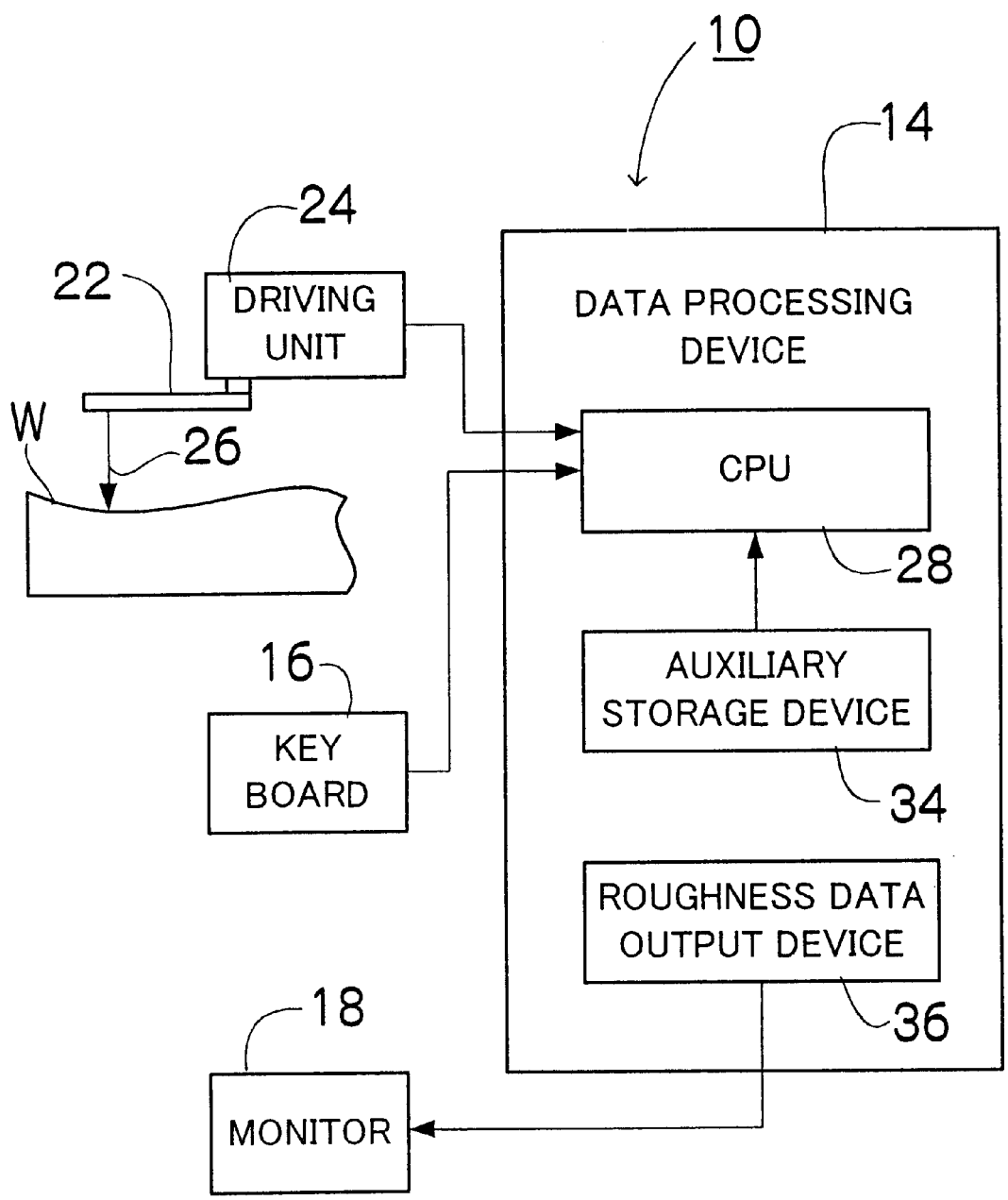

ROUGHNESS MEASURING METHOD AND APPARATUS

BACKGROUND OF THE INVENTION

1. Field of the Invention

The present invention relates to a roughness measuring method and apparatus, more specifically to ones which are capable of precisely measuring a surface roughness of a workpiece, on which processed surfaces with different roughnesses are formed.

2. Description of the Related Art

A surface roughness measuring apparatus is used for inspecting finished surface of a processed workpiece. In general, inspecting standard values are indicated in a drawing which shows instructions for processing a workpiece. The inspection reference values are parameters to be evaluated (Ra: arithmetrical mean roughness, Rz: ten point mean roughness, Sm: mean spacing of profile irregularities) and an allowable limit of the parameter values (roughness) to be evaluated. The surface roughness of the workpiece is measured in accordance with the inspecting standard values.

In fact, there are often cases where plural processed surfaces with different roughnesses are formed on the same plane of the workpiece. In a conventional manner, each roughness is preliminarily measured and a measurement starting point and a measurement length are set for each surface, then an evaluation value of each surface is obtained.

However, the conventional roughness measuring method and apparatus preliminarily measure a roughness of each plane and set the measurement starting point and the measurement length for each plane before a formal measurement; thus a measuring process takes much steps.

SUMMARY OF THE INVENTION

The present invention has been developed in view of the above-described circumstances. An object of the present invention is to provide a roughness measuring method and apparatus which is capable of efficiently measuring a roughness of a workpiece, on which processed surfaces with different roughnesses are formed.

In order to achieve the above-described object, the present invention is directed to a roughness measuring method comprising the following steps: specifying an area where a surface roughness of a workpiece is measured and setting a parameter to be evaluated as well as a maximum roughness value; obtaining measurement data indicating the surface roughness of the workpiece by measuring the entire range of the specified area to be measured; computing a roughness of the workpiece by the parameter to be evaluated from the measured data; comparing the computed roughness with the maximum value; computing a roughness by using only the measurement data of an evaluated area with a roughness value which is equal or under the maximum value if there is an evaluated area with a roughness value over the maximum value among the roughnesses that have been computed, and computing the roughness by using only the measurement data of an evaluated area with a roughness value over the maximum value; and displaying the respective roughnesses to a display device.

In order to achieve the above-described object, the present invention is also directed to a roughness measuring apparatus, comprising: a stylus moved on a surface of a workpiece in a state of coming into contact with the surface of the workpiece; a measurement area specifying device which specifies an area where the surface roughness of the workpiece is measured; a setting device which sets a parameter to be evaluated as well as a maximum roughness value; a measurement data obtaining device which moves the stylus across a total range of the measurement area specified by the measurement area specifying device to obtain measurement data indicating the surface roughness of the workpiece; a computing device which computes the surface roughness of the workpiece by the parameter to be evaluated which has been set by the setting device from the measurement data obtained by the measurement data obtaining device; a comparing device which compares the roughness computed by the computing device with the maximum value; a control device which computes a roughness by using the measurement data of an evaluated area with a roughness value which is equal or under the maximum value if there is an area to be evaluated with a roughness value over the maximum value among the roughnesses which have been computed by the computing device, and computing a roughness by using only the measurement data of an area to be evaluated with a roughness value over the maximum value; and a display device which displays the respective roughnesses which are computed by the control device.

According to the present invention, first, an area where the surface roughness of the workpiece is measured is specified by a measurement area specifying device. Second, a parameter to be evaluated and a maximum roughness value are set by a setting device. The maximum roughness value may be a desired value of the parameter to be evaluated, or may be a desired value of peak-to-peak of a roughness curvature.

Then, the entire range of the specified area is measured, and measurement data indicating a surface roughness of the workpiece is obtained by a measurement data obtaining device.

Next, the roughness of the workpiece by the parameter to be evaluated, which has been set by the setting device, is computed by a computing device from the measurement data having been obtained. Then the roughness computed by the computing device is compared with the maximum value by a comparing device. If there is an evaluated area with a roughness value over the maximum value among the roughnesses which have been computed by the computing device, a control device computes a roughness by using only the measurement data of an evaluated area with the roughness value which is equal or under the maximum value, and computes a roughness by using only the measurement data of an evaluated area with the roughness value over the maximum value. After that, a roughness output device outputs the respective roughnesses to the display device, and a display device displays the output roughnesses. The present invention efficiently obtains the evaluation values of the respective processed surfaces with different roughnesses through the above-described processes.

The selected parameter to be evaluated and the maximum roughness value can be set after obtaining the measurement data which indicates the surface roughness of the workpiece.

In another embodiment, first, the selected parameter to be evaluated and the maximum roughness value are set by the setting device. Second, an area where the surface roughness of the workpiece is measured is specified by the measurement area specifying device. Then measuring the roughness of the area starts, and the measurement data indicating the surface roughness of the workpiece is outputted from the data output device.

Next, the roughness of the workpiece by the parameter to be evaluated which has been set by the setting device is computed by the computing device from the measurement data outputted from the data output device. Then the roughness value computed by the computing device is compared with the maximum value by the comparing device. If the roughness which has been computed by the computing device is over the maximum value, the control device computes a roughness by using the measurement data, which has been outputted from the data output device. The roughness computed by the control device is outputted to the display device by the roughness output device in order to display the data to the display device. Since the present invention obtains an evaluation value only from the measurement data of the roughness which is equal or under the maximum value, that is, only from the desired measurement data, a highly confident evaluation value can be obtained. The evaluation value may be obtained also only from the measurement data of the roughness over the maximum value.

As set forth hereinabove, according to the roughness measuring method and apparatus of the present invention, a parameter to be evaluated and a maximum roughness value are set, and a roughness is computed by using only the measurement data of an evaluated area with a roughness value which is equal or under the maximum value if there is an evaluated area with a roughness value over the maximum value among the computed roughnesses, and a roughness is computed by using only the measurement data of an evaluated area with a roughness value over the maximum value. Thus, the present invention efficiently obtains evaluation values of respective processed surfaces with different roughnesses.

Further, according to the present invention, a selected parameter to be evaluated and a maximum roughness value are set, and a roughness is computed by using only the measurement data which has been outputted if a computed roughness exceeds the maximum value. Therefore, the present invention obtains an evaluation value only from the measurement data of a roughness which is equal or under the maximum value, that is, the evaluation value only from the desired measurement data; hence evaluation values of the processed surfaces can be efficiently obtained.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a block diagram showing a structure of the roughness measurement apparatus in FIG. 1;

DETAILED DESCRIPTION OF THE PREFERRED EMBODIMENTS

Hereunder a preferred embodiment of a roughness measuring method and apparatus of the present invention will be described in detail in accordance with the accompanying drawings.

Figure 1:
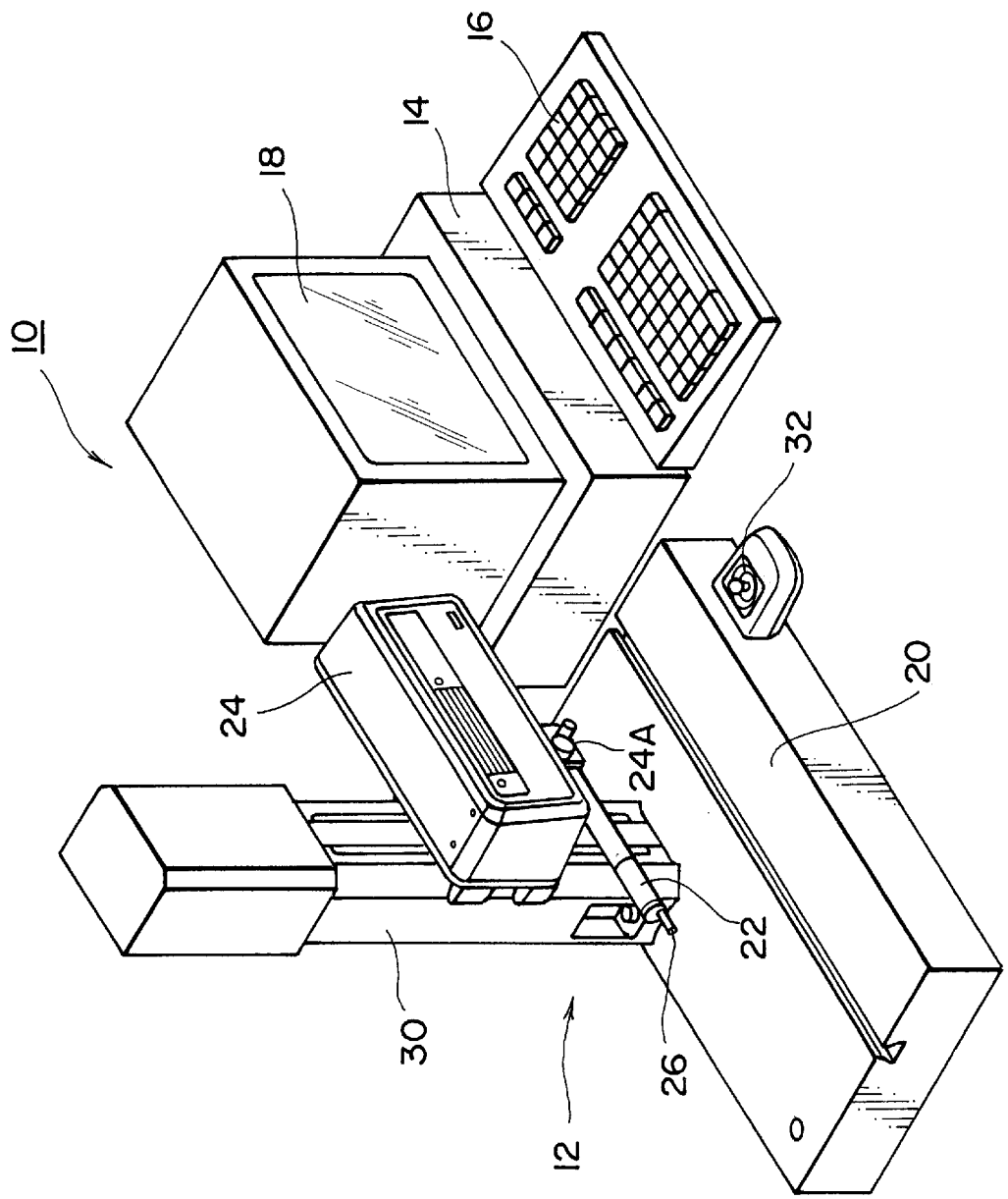
FIG. 1 is a view of an entire roughness measuring apparatus in a present embodiment.

A roughness measuring apparatus 10 of a present embodiment in FIG. 1 comprises measurement unit (a data output device) 12, a data processing device 14, an input device 16 (including a measurement area specifying device and a setting device) such as a keyboard and a mouse, and a monitor 18. The measurement unit 12 has a pickup 22 which measures a surface roughness of a work W in FIG. 2 which is placed on a measurement stage 20. The pickup 22 is supported by a holder 24A of a driving unit 24.

The pickup 22 has a stylus 26 on the top end. A displacement amount of the stylus 26 is converted into a voltage by a differential transformer transducer (not shown), which is built in the driving unit 24. A voltage value is converted from analog to digital by an A/D converter, and is outputted to a CPU 28 (including a measurement data obtaining device, a computing device, a control device, and a comparing device) of a data processing device 14. Through this process, measurement data indicating the surface roughness of the workpiece W is obtained by the CPU 28.

As seen from FIG. 1, the driving unit 24 is mounted on a column 30, which is placed straight on the measurement stage 20. The driving unit 24 moves up and down along the column 30 and the holder 24A moves from side to side by driving a motor in accordance with instructions from the CPU 28 in FIG. 2. The driving unit 24 may also be operated by a joystick 32, which is placed at the front face of the measurement stage 20.

As seen now from FIG. 2, an auxiliary storage device 34 such as a hard disk or an EEPROM, which is electrically erasable and writable, is built in the data processing device 14. The auxiliary storage device 34 stores four types of standard cut-off values λ (0.08 mm, 0.25 mm, 0.8 mm, and 2.5 mm) and a maximum roughness value which is set by the keyboard 16 and the like. The cut-off values and the maximum roughness value are read out by the CPU 28 at a time of roughness measuring.

Figure 3:
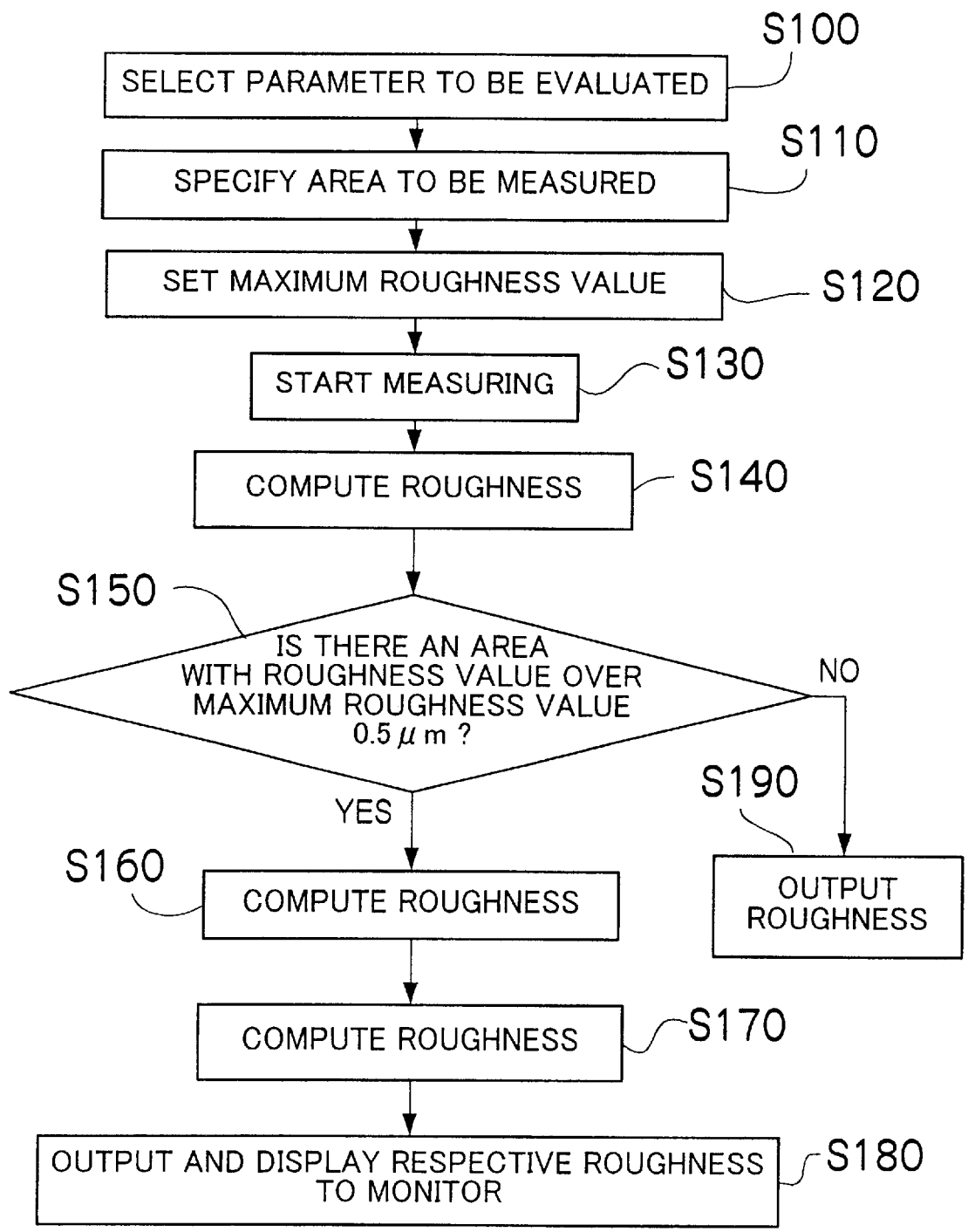
FIG. 3 is a flowchart showing a first embodiment of a roughness measuring method.

Now, a first control method of the roughness measuring apparatus 10 is described by referring to a flowchart in FIG. 3.

As seen from FIG. 3, a parameter to be evaluated (Ra, Rz, or sm) is selected by using the keyboard 16 (step S100). If plural parameters are selected to be evaluated, a parameter with a higher frequency of use is taken and its evaluation value is outputted first. For example, an order of priority in ISO is Ra, Rz, and Sm.

Next, a measurement length (a measurement area) is specified by using the keyboard 16 (step S110), and a maximum value (e.g. 0.5 $\mu$m) of the measurement length (area) is set by using the keyboard 16 (step S120). The maximum value is not limited to 0.5 $\mu$m and may be set at a desired value, or may even be set based on inspecting standard values of a processed surface of the workpiece W, which is indicated on a drawing. Moreover, the maximum value may be set at a range (for example 0.2 $\mu$m –0.6 $\mu$m), and the maximum value may be set after obtaining measurement data indicating the surface roughness of the workpiece.

Now measuring starts (step S130), and the entire range of the specified length (area) is measured, and the measurement data indicating the surface roughness of the workpiece is obtained.

Next, the CPU 28 computes a surface roughness of the workpiece by the parameters (Ra) to be evaluated which has been set with the keyboard 16 from the obtained measurement data (step S140).

Figure 4:
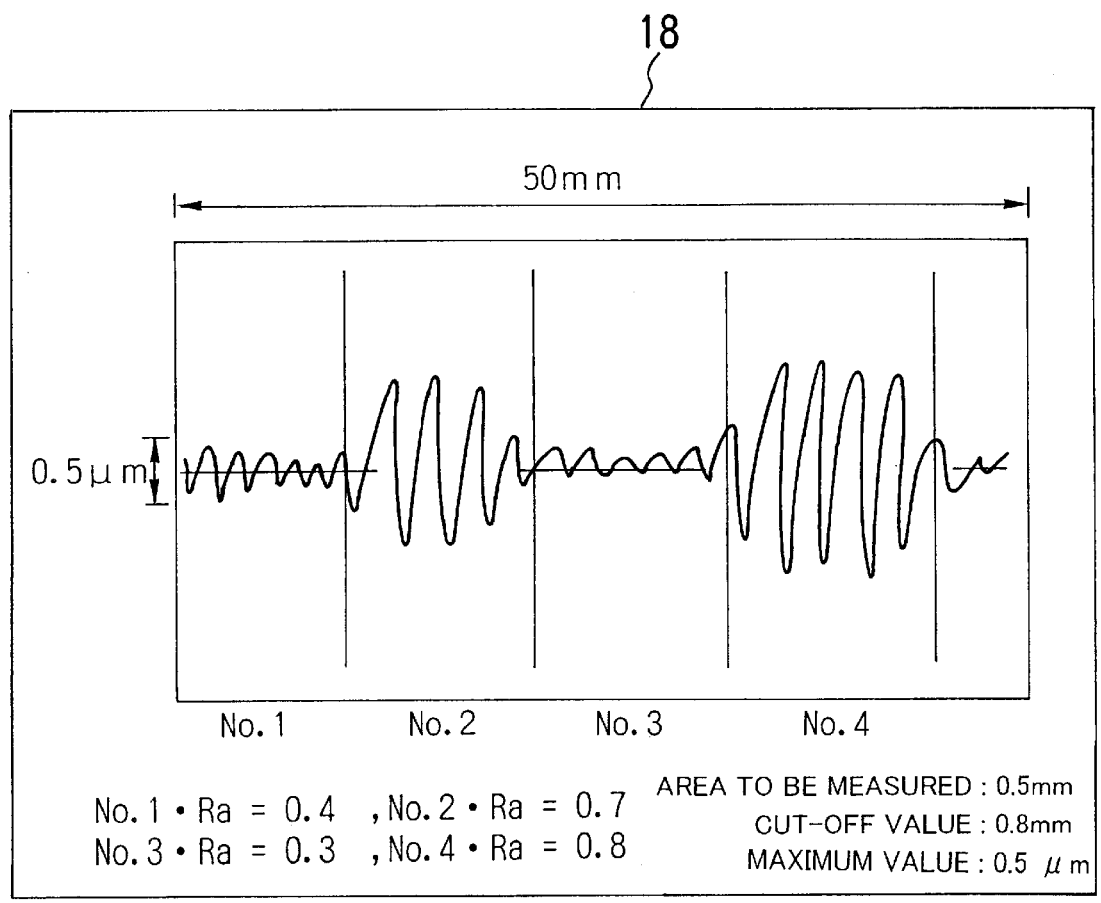
FIG. 4 is a schematic view of the flowchart in FIG. 3.

Then, the roughness which has been computed by the CPU 28 is compared with the maximum value (0.5 $\mu$m) by the CPU 28 (step S150). If there is an evaluated length (area)

with a roughness value over the maximum value (0.5 µm) among the computed roughnesses, the CPU 28 computes a roughness by using only the measurement data of an evaluated length (area) with a roughness which is equal or under the maximum value (0.5 µm) (step S160). After that, the CPU 28 computes a roughness by using only the measurement data of an evaluated length (area) with a roughness over the maximum value (0.5 µm) (step S170). The CPU 28 displays the respective roughnesses to the monitor 18 (step S180). As seen from FIG. 4, the monitor 18 displays a roughness curvature depicting roughnesses of processed surfaces No.1–No.4, an area (length) to be measured (50 mm) which has been set beforehand, the maximum value (0.5 µm), and a cut-off value (0.8 mm) which is used for the measuring. The monitor 18 also displays the roughnesses Ra of the processed surfaces No.1–No.4 which have been computed by the CPU 28 as follows: No.1·Ra=0.4; No.2·Ra=0.7; No.3·Ra=0.3; and No.4·Ra=0.8.

Because the measuring apparatus 10 of the present embodiment can obtain an evaluation value of each of the processed surfaces with different roughnesses by one measurement operation through the above-described process, the measuring apparatus 10 can efficiently obtain an evaluation value. If there is no evaluation length (area) with a roughness value over the maximum value (0.5 µm) among the roughnesses which have been computed at step S150 in FIG. 3, the CPU 28 computes a roughness of the workpiece from the entire measurement data indicating the surface roughness of the workpiece, and outputs the roughness data to the monitor 18 (step S190). Moreover, plural evaluated areas with roughness values over the maximum value are determined as one unit of areas, while plural evaluated areas with roughness values which do not exceed the maximum value are determined as another unit of areas, so that the areas may be evaluated unit by unit.

Figure 5:
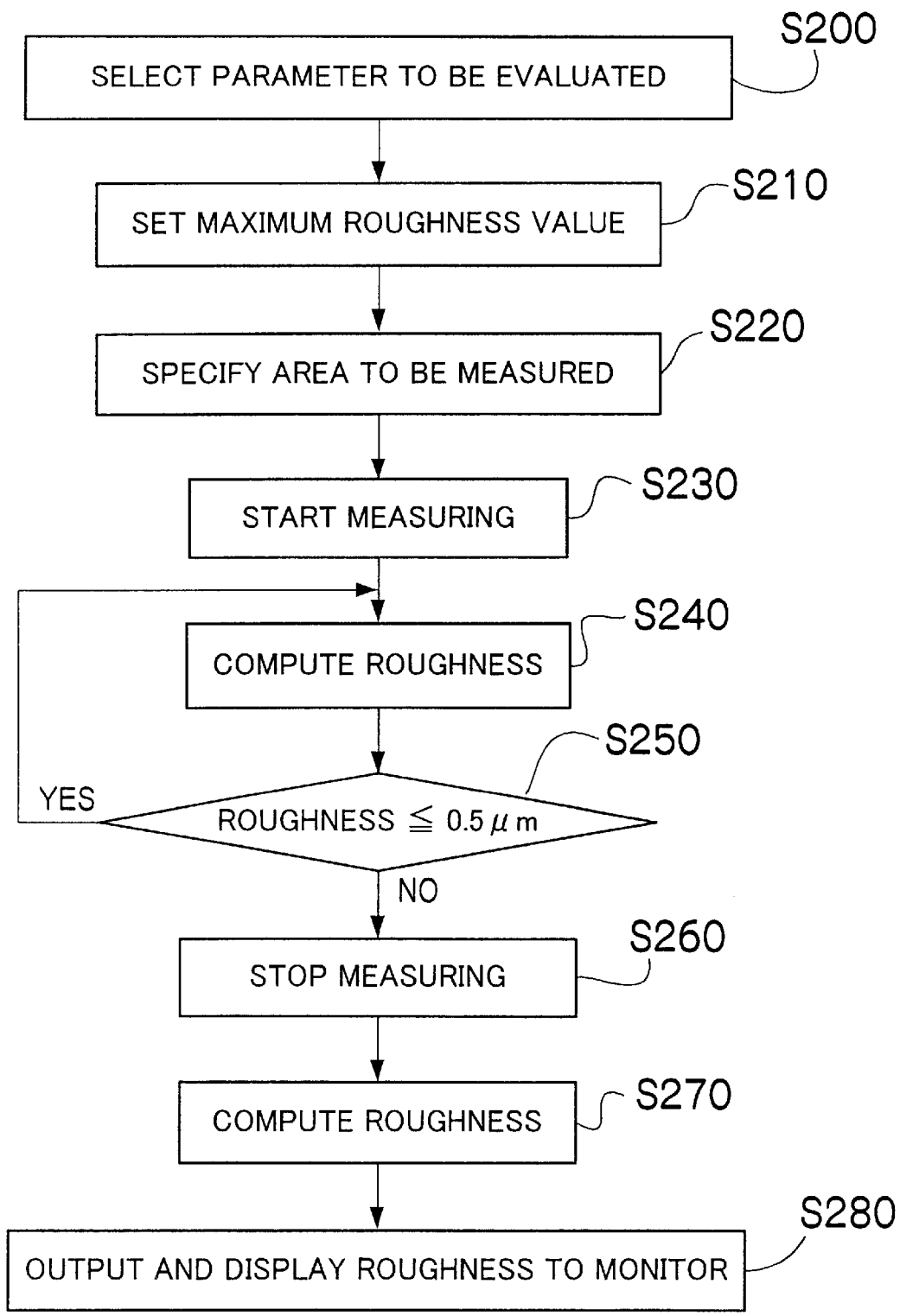
FIG. 5 is a flowchart showing a second embodiment of the roughness measuring method.

FIG. 5 is a flowchart showing a second roughness measuring method.

First, parameters (Ra) to be evaluated is selected by the keyboard 16 (step S200), and a maximum roughness value (0.5 µm) is set by the keyboard 16 (step S210). The maximum value (0.5 µm) is set based on inspecting standard values of a surface of the workpiece W to be measured or values which is determined beforehand by a preliminary measurement.

Next, the measurement length (measurement area) is specified by using again the keyboard 16 or the like (step S220).

Now measuring starts (step S230), and the CPU 28 computes a roughness of the workpiece by the parameters (Ra) to be evaluated from the measurement data outputted from the measuring unit 12 (step S240).

The CPU 28 compares the computed roughness with the maximum value (0.5 µm), and stops the measuring performed by the measuring unit 12 (step S260) if the computed roughness is over the maximum value (0.5 µm) (step S250). After that, the CPU 28 computes a roughness from the measurement data which has been outputted from the measuring part 12 (step S270). At last, the CPU 28 outputs and displays the computed roughness to the monitor 18 (step S280).

By the above-described process, the present invention obtains an evaluation value only from the measurement data with a roughness which is equal or under the maximum value (0.5 µm), that is, an evaluation value only from the desired measurement data; thus, a highly confident evaluation value can be obtained. Moreover, the evaluation value may also be obtained only from the measurement data with a roughness value over the maximum value (0.5 µm).

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A roughness measuring method comprising the following steps:

specifying an area where a surface roughness of a workpiece is measured and setting a parameter to be evaluated as well as a maximum roughness value;

obtaining measurement data indicating the surface roughness of the workpiece by measuring the entire range of said specified area to be measured;

computing a roughness of the workpiece by said parameter to be evaluated from the measured data;

comparing the computed roughness with said maximum value;

computing a roughness by using only the measurement data of an evaluated area with a roughness value which is equal or under the maximum value if there is an evaluated area with a roughness value over said maximum value among the roughnesses that have been computed, and computing the roughness by using only the measurement data of an evaluated area with a roughness value over the maximum value; and displaying said respective roughnesses to a display device.

2. A roughness measuring method comprising the following steps:

specifying an area where a surface roughness of a workpiece is measured;

obtaining measurement data indicating the surface roughness of the workpiece by measuring the entire range of said specified area to be measured;

setting a parameter to be evaluated as well as a maximum roughness value in order to compute the roughness of the workpiece by said parameter to be evaluated from said measurement data;

comparing the computed roughness with said maximum value;

computing a roughness by using only the measurement data of an evaluated area with a roughness value which is equal or under the maximum value if there is an evaluated area with a roughness value over the maximum value among the computed roughnesses, and computing the roughness by using only the measurement data of an evaluated area with a roughness value over the maximum value; and displaying said respective roughnesses to a display device.

3. A roughness measuring method comprising the following steps:

setting a parameter to be evaluated as well as a maximum roughness value;

specifying an area where a surface roughness of a workpiece is measured;

starting measurement of a roughness of said specified area to be measured and outputting measurement data indicating the surface roughness of the workpiece;

computing a roughness of the workpiece by said parameter to be evaluated from the output measurement data;

comparing the computed roughness with said maximum value;

computing a roughness by using measurement data which has been outputted if the computed roughness is over said maximum value; and displaying the roughness to a display device.

4. A roughness measuring apparatus, comprising:

a stylus moved on a surface of a workpiece in a state of coming into contact with the surface of the workpiece;

a measurement area specifying device which specifies an area where the surface roughness of the workpiece is measured;

a setting device which sets a parameter to be evaluated as well as a maximum roughness value;

a measurement data obtaining device which moves the stylus across a total range of the measurement area specified by the measurement area specifying device to obtain measurement data indicating the surface roughness of the workpiece;

a computing device which computes the surface roughness of the workpiece by said parameter to be evaluated which has been set by said setting device from said measurement data obtained by the measurement data obtaining device;

a comparing device which compares the roughness computed by the computing device with said maximum value;

a control device which computes a roughness by using the measurement data of an evaluated area with a roughness value which is equal or under the maximum value if there is an area to be evaluated with a roughness value over said maximum value among the roughnesses which have been computed by the computing device, and computing a roughness by using only the measurement data of an area to be evaluated with a roughness value over the maximum value; and a display device which displays said respective roughnesses which are computed by said control device.

5. A roughness measuring apparatus, comprising:

a stylus moved on a surface of a workpiece in a state of coming into contact with the surface of the workpiece;

a setting device which sets a selected parameter to be evaluated as well as a maximum roughness value;

a data obtaining device which obtains measurement data indicating the surface roughness of the workpiece by moving the stylus across entire range of said specified area to be measured;

a computing device which sets the parameter to be evaluated as well as the maximum roughness value and computing a roughness of the workpiece by said parameter to be evaluated from said measurement data;

a comparing device which compares the roughness computed by the computing device with said maximum value;

a control device which computes the roughness by using only the measurement data of an evaluated area with a roughness value which is equal or under the maximum value if there is an evaluated area with a roughness value over said maximum value among the roughnesses which have been computed by the computing device, and computing the roughness by using only the measurement data of an evaluated area with a roughness value over the maximum value; and a display device which displays said respective roughnesses computed by the control device.

6. A roughness measuring apparatus, comprising:

a stylus moved on a surface of a workpiece in a state of coming into contact with the surface of the workpiece;

a setting device which sets a parameter to be evaluated as well as a maximum roughness value;

a measurement area specifying device which specifies an area where the surface roughness of the workpiece is measured;

a data output device which measures a roughness of the area to be measured which has been specified by the measurement area specifying device by moving the stylus across the area to be measured and outputting measurement data indicating the surface roughness of the workpiece;

a computing device which computes a roughness of the workpiece by the parameter to be evaluated which has been set by said setting device from the measurement data which is outputted from the data output device;

a comparing device which compares the roughness computed by the computing device with said maximum value;

a control device which computes a roughness by using said measurement data which has been outputted if the roughness computed by the computing device is over said maximum value; and a display device which displays the roughness computed by the control device.

* * * * *